United States Patent [19]
Elliston

[11] 3,715,652
[45] Feb. 6, 1973

[54] HIGH SPEED BUCK-BOOST ALTERNATING CURRENT REGULATOR

[75] Inventor: Robert O. Elliston, Del Mar, Calif.

[73] Assignee: Elgar Corporation, San Diego, Calif.

[22] Filed: March 15, 1972

[21] Appl. No.: 234,973

[52] U.S. Cl....................................323/45, 323/57
[51] Int. Cl..............................G05f 1/38, H02m 5/44
[58] Field of Search ...323/45, 57, 6; 336/148; 321/2, 321/18

[56] References Cited

UNITED STATES PATENTS

| 2,965,833 | 12/1960 | Jensen | 323/45 |
| 3,233,165 | 2/1966 | Bedford | 323/45 X |
| 3,499,169 | 3/1970 | McVey et al. | 323/45 |
| 3,624,405 | 11/1971 | Bishop et al. | 323/57 X |

*Primary Examiner*—Gerald Goldberg
*Attorney*—Warren H. F. Schmieding

[57] ABSTRACT

An alternating current regulator in which all current flowing to an output conductor from a secondary winding of a transformer flows through a power amplifier, including the current flowing through a feedback loop.

3 Claims, 1 Drawing Figure

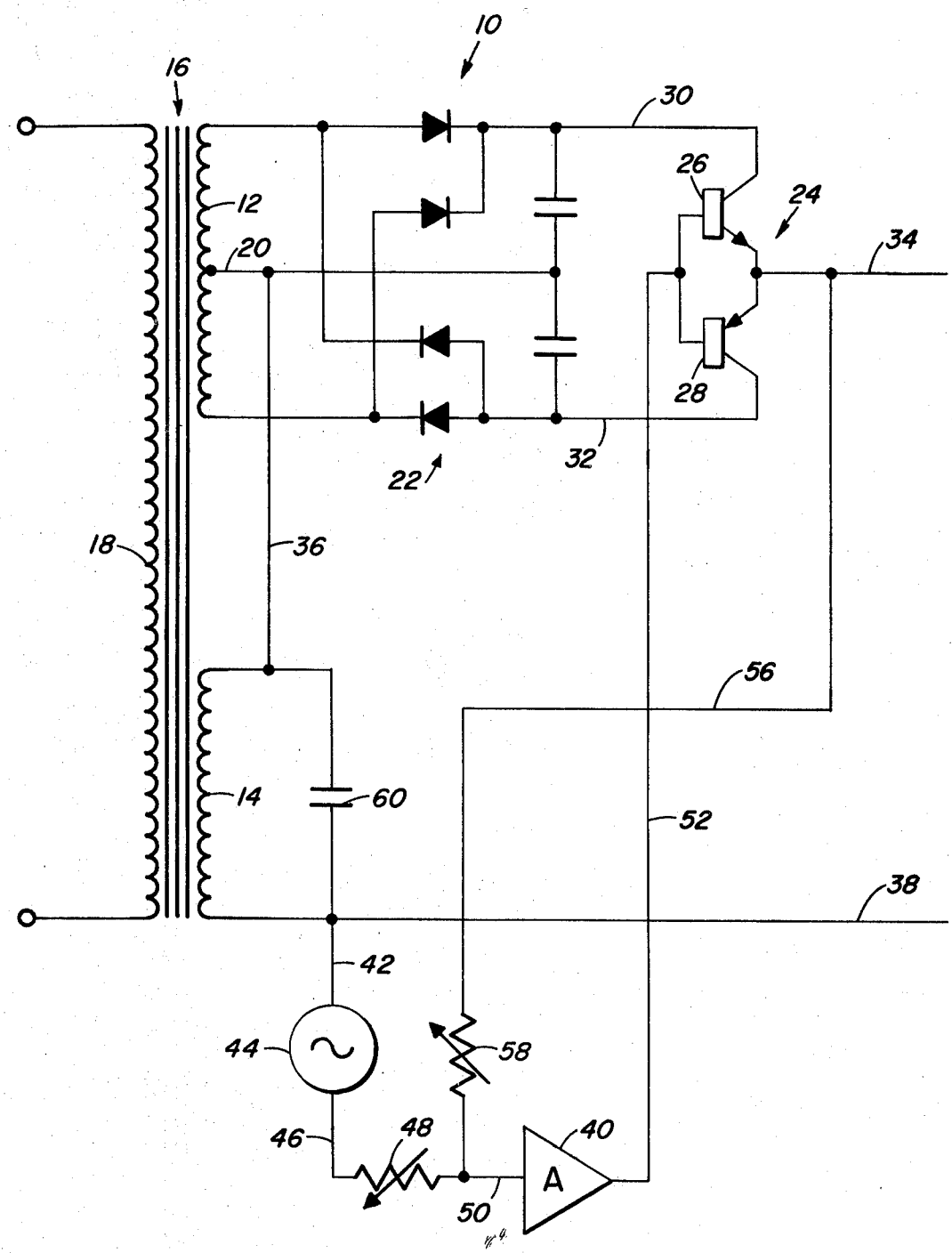

HIGH SPEED BUCK-BOOST ALTERNATING CURRENT REGULATOR

BACKGROUND OF THE INVENTION

1. Field of the Invention

The regulator of the present invention is directed to an AC regulator having buck-boost power amplifier.

2. Description of the Prior Art

The regulators disclosed in the patents to Beszedics, U.S. Pat. No. 2,664,540; Jensen, U.S. Pat. No. 2,965,833; Bedford, U.S. Pat. No. 3,233,165; and McVey, U.S. Pat. No. 3,241,049, are the closest patented art relative to the present invention. The disclosure on pages 99, 100 and 101 of the August 1950 issue of Electronics is considered to be the most pertinent art. In that disclosure, the power amplifier supplies only the correction voltage necessary to regulate the output voltage and the majority of the output voltage is supplied by a secondary of a transformer or directly by the power line if the transformer is not used. The power line disturbances are injected directly into the feedback loop which generates correction signals.

In practicing the present invention, the entire output voltage to one of the output conductors flows through the power amplifier. Power line disturbances are injected through the feedback loop directly into the power amplifier.

SUMMARY OF THE INVENTION

The regulator comprises two windings, one of which is connected with a rectifier and the rectifier is connected with an output conductor through a power amplifier; a center tap is connected to said one winding and one end of the other winding is connected with the center tap and the opposite end of the other winding is connected with another output conductor; a preamplifier has its input end connected with the second mentioned output conductor and its output end is connected to the base of the power amplifier; a feedback loop comprises a conductor that is connected to the first mentioned output conductor, the preamplifier and the connection between the output end thereof and the base of the power amplifier.

Other features and the advantage of the present invention will be apparent from the following description, reference being made to the accompanying drawing wherein a preferred embodiment of the invention is illustrated.

BRIEF DESCRIPTION OF THE DRAWING

The drawing is a simplified schematic view of the present invention.

DESCRIPTION OF THE PREFERRED EMBODIMENT

The system 10 includes two AC coils 12 and 14 which, as shown, are secondary windings of a transformer 16, the primary of which is shown at 18. A center tap 20 is connected between the opposite ends of winding 12, and the center tap is connected with a rectifier 22. The rectifier is connected to the base of an amplifier 24, which amplifier includes two complementary transistors 26 and 28. Transistor 26 is connected with the rectifier 22 by a conductor 30, and transistor 28 is connected to the rectifier by a conductor 32. The output end of the amplifier 24 is connected to output conductor 34.

One end of winding 14 is connected with the center tap 20 by a conductor 36. The opposite end of winding 14 is connected to an output conductor 38. A preamplifier 40 has its input end connected with the output conductor 38 via conductor 42, reference 44, conductor 46, variable resistance 48 and conductor 50. The output end is connected to the base of transistors 26 and 28 of amplifier 24 by a conductor 52.

A feedback loop includes a conductor 56 that is connected to output conductor 34, a variable resistance 58, conductor 50, amplifier 40 and conductor 52. As an example, the value of resistance 48 may be of 3,000 ohms and that of resistance 58 of 115,000 ohms.

A capacitor 60 is disposed in parallel with the winding 14. This capacitor functions in conjunction with the leakage reactance and resistance of the primary winding 18 of the transformer to filter out the high frequency components of power line disturbances before they are injected into the regulatory system.

Fluctuation in voltage in windings 12 and 14 effects buck-boost function of winding 14, i.e. in the event of voltage drop below normal, winding 14 augments the output of winding 12; and in the event the voltage increases above normal, winding 14 bucks winding 12.

Transients introduced in windings 12 and 14 are attenuated by the feedback loop. It is to be observed that all current flowing from the preamplifier 40 must flow through the conductor 52 to the power amplifier 24.

Thus from the foregoing it is apparent that the AC reference voltage is a replica, both in amplitude and in waveform, of the desired output voltage. The AC output voltage is compared directly with the reference voltage, resulting in an error signal which corresponds to deviations in the instantaneous value of the output waveform from the desired voltage. The controlled quantity is the instantaneous value of the output waveform and the only limitation in the speed of response of the system is the time required for functioning of the power amplifier 24.

The power amplifier 24 of the present invention is connected in such manner that the AC line voltage of one of the output conductors appears only in the power circuit of the power amplifier; and in such manner that, in order for the line voltage disturbances to propagate to the output voltage, such disturbances must first be attenuated by the power supply rejection ratio of the power amplifier and then further attenuated by the feedback loop gain factor of the amplifier 40.

In actual test, the improvement in the attenuation of high frequency disturbance has been as high as thirty times that of the most pertinent art.

Having described my invention, I claim:

1. A buck-boost alternating voltage regulator comprising:
   A. an alternating current winding;
   B. a second alternating current winding;
   C. a rectifier;
   D. a center tap connecting the first mentioned winding with the rectifier;
   E. an alternating current output conductor;
   F. a power amplifier connected with the rectifier and the output conductor;
   G. a conductor connecting the center tap with one end of the second mentioned winding;

H. an output conductor connecting the opposite end of the second mentioned winding;
I. a preamplifier;
J. a conductor connecting the second mentioned output conductor with the second mentioned amplifier;
K. a resistance in said last mentioned conductor;
L. a conductor connecting the first mentioned output conductor to the input end of the second mentioned amplifier through a second resistance;
M. a conductor directly connecting the output end of the second mentioned amplifier to the first mentioned amplifier, whereby the first mentioned power amplifier is connected in such a way that the alternating current line voltage appears only in the power supply circuit of the first mentioned power amplifier, and in such way that in order for line voltage disturbances to propagate to the output, such disturbances must first be attenuated by the power supply rejection ratio of the first mentioned power amplifier and then further attenuated by the feedback loop gain factor of the entire system.

2. A regulator as defined in claim 1, characterized to include:

O. a capacitor disposed in parallel relationship with the second mentioned winding.

3. A regulator as defined in claim 1, characterized in that the first mentioned power amplifier comprises two complementary transistors.

* * * * *